(12) United States Patent
Kocherginsky (10) Patent No.: US 9,799,907 B2
(45) Date of Patent: Oct. 24, 2017

(54) REDOX MEMBRANE-BASED FLOW FUEL CELL AND METHOD

(71) Applicant: Nikolai M. Kocherginsky, Urbana, IL (US)

(72) Inventor: Nikolai M. Kocherginsky, Urbana, IL (US)

( * ) Notice: Subject to any disclaimer, the term of this patent is extended or adjusted under 35 U.S.C. 154(b) by 202 days.

(21) Appl. No.: 14/708,898

(22) Filed: May 11, 2015

(65) Prior Publication Data
US 2016/0226089 A1 Aug. 4, 2016

Related U.S. Application Data

(62) Division of application No. 12/706,713, filed on Feb. 17, 2010, now abandoned.

(51) Int. Cl.
*H01M 8/10* (2016.01)
*H01M 8/20* (2006.01)
*H01M 8/103* (2016.01)
*H01M 8/1032* (2016.01)
*H01M 8/1018* (2016.01)

(52) U.S. Cl.
CPC ......... *H01M 8/103* (2013.01); *H01M 8/1032* (2013.01); *H01M 8/20* (2013.01); *H01M 2008/1095* (2013.01); *H01M 2300/0082* (2013.01); *Y02E 60/528* (2013.01)

(58) Field of Classification Search
CPC ...... H01M 8/103; H01M 8/1032; H01M 8/20; H01M 2008/1095; H01M 2300/0082; Y02E 60/528
See application file for complete search history.

(56) References Cited

U.S. PATENT DOCUMENTS

| | | | | |
|---|---|---|---|---|
| 3,996,064 A * | 12/1976 | Thaller | ............... | H01M 8/188 320/128 |
| 4,133,941 A * | 1/1979 | Sheibley | ............... | C08J 5/2218 429/101 |
| 4,311,771 A * | 1/1982 | Walther | ............... | H01M 8/227 204/534 |
| 4,585,536 A * | 4/1986 | Puetter | ............... | B01D 61/44 204/539 |
| 2005/0106425 A1* | 5/2005 | Damore | ............... | B82Y 30/00 429/401 |

OTHER PUBLICATIONS

Kocherginsky et a.; "Ion/Electron Coupled Transport Through Polyaniline Membrane Fast Transmembrane Redox Reactions at Neutral pH"; J. Phys. Chem. B (2008) 112, pp. 7016-7021.*
Kocherginsky et al.; "Redox reaction of polyaniline doped with d,l—camphor sulfonic acid"; Reactive & Functional Polymers 66 (Available onine May 26, 2006), pp. 1384-1393.*

* cited by examiner

*Primary Examiner* — Gregg Cantelmo
(74) *Attorney, Agent, or Firm* — Greer, Burns & Crain, Ltd.; Steven P. Fallon (57) ABSTRACT

A redox membrane based flow fuel cell includes a reducing agent solution compartment with an inlet and outlet to supply reducing agent solution and an oxidation agent solution compartment with an inlet and outlet to supply oxidation agent solution. A barrier separating the compartments consists of a water-insoluble synthetic metal polymer membrane lacking any separate electrode on surfaces of the membrane and being exposed directly to the solutions. A current collection electrode is in each of the compartments and is disposed to convert ion- to electron-based currents. The current collection electrodes can be reference electrodes.

6 Claims, 5 Drawing Sheets

REDOX MEMBRANE-BASED FLOW FUEL CELL AND METHOD

PRIORITY CLAIM AND REFERENCE TO RELATED APPLICATION

The application is a divisional of and claims priority under 35 U.S.C.§120 from prior application Ser. No. 12/706,713, which was filed Feb. 17, 2010, and which is incorporated by reference herein.

TECHNICAL FIELD

The present invention relates to a method to generate electric energy using electrochemical membrane cell, in particular using a dense membrane made of electroconductive polymers known as synthetic metals, where the membrane separates two solutions with different redox active substances.

BACKGROUND

Traditional systems for electrochemical energy storage and conversion include batteries, fuel cells, and electrochemical capacitors. Common features of these systems are that the energy-providing electrochemical processes take place at the boundary of the electrode/electrolyte interface and that the electron and ion transport from one electrode to another are separated in space.

Batteries are closed systems, with the anode and cathode being the charge-transfer medium taking an active role in the redox reaction, so that the voltage is generated on the electrodes, while a reducing or oxidizing reactants which provide chemical energy are stored in the same compartment. Fuel cells are open systems where the anode and cathode are just charge-transfer media and the active chemicals undergoing the redox 110 reaction are delivered from outside the cell. Usually these are oxygen from air, and fuels such as hydrogen and hydrocarbons from a tank. Energy storage (in the tank and air) and energy conversion (in the fuel cell) are thus separated in space.

In electrochemical capacitors (or supercapacitors), initially energy to charge the capacitor may be delivered both via redox reactions and/or with the external source of AC or even DC current. Redox processes result in the accumulation of energy-reach redox state of the material inside the capacitor. The capacitor is used for the charge separation between phases and finally generates an electric current during the discharge operation. In addition to this process, orientation of electrolyte ions at the interfaces leads to the initial charge and then discharge of electrical double layers in the same phase, which results in the energy-delivering movement of electrons in the external wire.

Both voltaic cells and fuel cells often have a special porous separator, so that pH and composition near cathodes and anodes can be kept different Ion-exchange membranes also may be used as a separator. Ions can easily and selectively penetrate through the membrane from one electrode to another inside the cell, while electrons are transported outside of the cell. Different redox potentials at the anode and cathode lead to the redox reactions at the interface electrolyte/electrode, charge separation and generation of the open circuit voltage between the anode and cathode. When the electrons move in a wire outside the battery from an anode to cathode, to keep total electroneutrality negative ions should move in the cell in the opposite direction through the membrane or it may be that positive ions, especially $H^+$, are moving inside the cell through the membrane from the anode to the cathode. Positive and small $H^+$ ions have the highest diffusion coefficient and can be present in high concentrations, leading to low internal electric resistance of the cell. This is why proton-selective ion-exchanging membranes are used in many galvanic cells.

The problem with fuel cells, including direct methanol fuel cells, is that oxygen reduction reaction, is very slow and a catalyst is needed. The electrodes in this case are usually made with expensive alloys or Pt, which lose their catalytic activity in the presence of different impurities, including $CO_2$, CO and $H_2S$.

The problem becomes even more complicated because exchange currents for anode and cathode reactions on Pt can be limited by both ion transport in solutions and interface electron transfer, thus leading to the current-overpotential, i.e. it is necessary to use voltage higher than its thermodynamic equilibrium value to start and conduct fast electrochemical reaction.

Application of fuel cells in underwater vehicles has another problem. Unlike ground and air transportation, these vehicles must carry both the fuel and the oxygen source because the oxygen concentration in water is insufficient to meet the vehicle power requirements. The oxygen source must possess a high oxygen content to accommodate the weight and volume constraints of the vehicle design, and to be amenable to safe handling and storage onboard submarines and surface ships. Gaseous oxygen storage does not provide adequate storage densities, while liquid oxygen storage introduces challenges with handling and storage. Liquid sources, such as hydrogen peroxide ($H_2O_2$), require compact, efficient, controllable conversion methods to produce oxygen and handle reaction byproducts. Solid-state oxygen sources such as sodium chlorate ($NaClO_3$) and lithium perchlorate ($LiClO_4$) possess high oxygen contents and are stable under ambient conditions; however, decomposition of these materials to gaseous oxygen typically employs thermal methods that are difficult to start, to stop, and to control. All this clearly demonstrates the necessity to find innovative approaches to use chemical energy of these oxidants.

Fuel cells without the oxygen cathode are a promising approach to resolve many issues with oxygen reduction reaction. One of these approaches is to use redox flow batteries where another electrode and oxidant are used instead of Pt/oxygen. These batteries are based on reversible redox reactions and initially were suggested in NASA. They can be used in submarine applications to accumulate, to store and to use electric energy when necessary, but have the major challenge, which is nonselective ionic and water migration through the ion-exchange membrane.

A fundamentally different principle of voltage generation can be found in Nature. For example, an electric organ of an eel *Electrophorus electricus* is a stack of biological membranes. This organ during excitation can generate voltages up to 1000V and currents up to 1 A. There are no electrochemical reactions on electrodes, and because of the high packing density of the membranes it could be possible to make an artificial membrane-based source of electric energy with high power and small volume. The problem is that these biological membranes are not stable and cannot be used as an electrochemical power source in everyday life.

If an artificial ion-selective membrane separates two solutions with different activity of penetrating ions, this by itself should lead to the charge separation and generation of transmembrane electric potential. If the membrane has high permeability of these ions and, as the result, low electric resistance, this also could be used as an electrochemical cell. These electrochemical cells are called concentration elements, but they did not find practical applications because of the low generated voltage. For an ideal ion-selective membrane, according to the Nernst Law 10 times concentration difference at room temperature leads to less than 60 mV voltage. Even if pH difference is 14, an ideal voltage is only 840 mV, which is much less than the voltage, which is possible to generate using redox reactions. This voltage is generated on a pH-selective glass membranes in pH electrodes, but extremely high membrane resistance does not allow using it as a source of electric energy. To make a good battery it is not enough to have high voltage. In addition, the internal resistance of the battery including the membrane must be low to have reasonably high electric current.

SUMMARY OF THE INVENTION

Embodiments of the invention provide an improved electrochemical cell with the practically-important voltage generated on a membrane. Embodiments of the invention also provide an electrochemical flow cell, which does not require platinum electrodes and will be able to react with many different reducing and oxidizing agents. A preferred low fuel cell provides a source of electrochemical energy with the membrane separating two flowing aqueous solutions with dissolved reducing and oxidizing components and electrodes of the second kind, wherein the membrane is made of a redox active synthetic metal polymer.

BRIEF DESCRIPTION OF THE DRAWINGS

Scheme 1 shows continuous oxygen reduction and $H_2O_2$ formation in redox polyaniline membrane-based flow fuel cell with applied reducing potential (reducing agent)

DETAILED DESCRIPTION OF THE PREFERRED EMBODIMENTS

Derivatives of polyanilines, polythyophenes and polypyrroles are typical of the so-called synthetic metals. As used herein, synthetic metals include not just polymers of the pure monomer but rather the class of polymers derived from the base class of substituted monomers. By way of illustration, a polyaniline (PANI) may include not only aniline as a monomer, but also copolymers of aniline that can be selected from the aniline monomer substituted with alkyl, alkoxy, aryl, hydroxyl, amino, sulfo and sulfonic groups, substituted methyl anilines, substituted ethyl or propyl anilines, substituted methoxy or ethoxy anilines, phenyl substituted anilines, chloro-, fluoro-substituted anilines, amino-substituted anilines, hydroxyl substituted anilines and the like. Hydrogen atoms on the nitrogen of aniline can also be substituted by methyl, propyl, butyl, and phenyl group, i.e., N-methyl, N-propyl, N-butyl, and N-phenyl substituted anilines. Others include electrically conducting polymers like polythiophene and poly(3-methyl)thiophene and poly(3,4-ethylenedioxythiophene), known as PEDOT, and the like known to those skilled in the art. Provided that the polymer retains the basic electrical conductivity and redox properties, it is suitable for use in the invention. The foregoing materials are collectively referred to as synthetic metals in this application.

Dopants such as camphor sulfonic acid (CSA) are preferred because its molecular size is large, and it does not leave the polymer when it is in contact with water. In this way PANI stays electroconductive even at neutral pH. Sulfo- or sulfonic groups on polyaniline are important substituents, because in this case PANI is self-doped, and, for example, additional doping agents like CSA are then not necessary. As the result of doping, electric conductivity of PANI may increase by almost ten orders of magnitude.

Preferred salt solutions should have an anion, which is able to enter the polymer in exchange for an electron. The preferred anion is chloride, but others are also possible, such as iodide, fluoride, $CNS^-$, $SCN^-$, nitrophenolate.

Nonporous polymer membrane, made with some electroconductive polymers, can be redox active. These membranes can be reduced by a reducing agent dissolved in an aqueous solution on one side, and simultaneously they can be re-oxidized by an oxidant dissolved in a solution on another side of the membrane. This process is possible because the membranes are permeable not only for electrons but also for ions. Transport of these ions makes the whole transmembrane reaction electrically neutral. Simultaneously, if the transport of electrons is much faster that ion transport, it leads to the charge separation and generation of transmembrane voltage. The value of the voltage is determined by the difference of redox potentials in both separated by the membrane solutions and can be high enough for practical applications. To use this voltage it is necessary to add two current collecting electrodes of the second kind, one in each solution. These electrodes, for example Ag/AgCl, are the electrodes where a metal is in contact with a solution containing anions that form a sparingly soluble salt with the metal cation. To avoid side reactions with redox active components of the solution, such as ferricianide, these Ag/AgCl electrodes are separated from the solution and interact with it through an immobilized liquid junction, which finally allows conversion of ionic current in a solution into the current of electrons in a metal. In this case electrons are transferred from a reducing agent to an oxidant through the membrane inside the cell, then the current is carried by ions in a solution and, finally, again by electrons in the wires, while in a common electrochemical cell the reducing agent reacts with an electrode and then electrons are transported outside the electrochemical cell into an opposite direction.

The dense membrane does not have large pores and is made of the polymers, which are known as "synthetic metals". The polymer has a system of polyconjugated double bonds, serving as a path for electron conductivity. When properly made, the polymer has high electric conductivity determined by the electron transport through the polymer. Further, at the interface this electron current can be converted into ionic current of chloride ions in a solution, similar to what happens at the interface of Ag/AgCl electrodes. As the result, it is possible to generate the transmembrane voltage of practically important magnitude and to use it in an electrochemical system with low electric resistance as an efficient electric power source.

In the preferred redox fuel cell electric voltage is generated directly on a membrane and Pt electrodes are not necessary. Instead of oxygen or air it is possible to use different oxidants in flowing aqueous solutions without their preliminary conversion to oxygen. Reducing agents on another side of the membrane also can be delivered as an aqueous solution. This will give the ability to mechanically replenish both the oxidant and the "fuel" source and to meet power and energy requirements. The membrane is stable enough, so that it is possible to use an oxidant and reducing agent in amounts equivalent to much more than usual amount in a closed battery. Utilization of the reactants can be further increased if the solutions are flowing in a battery from one membrane-based flow fuel cell to another.

Initial oxidant and reducing agents can be stored in a stable and save solid form, thus making the system attractable based both on a total system weight and volume.

Synthetic metals can be reduced by very many different reducing chemicals, thus eliminating the need to use hydrocarbons as a fuel. Additional opportunity is to use reversible redox reactants, so that the electrochemical system becomes rechargeable. In this case an external source of electrochemical energy for example, from power stations during night time, can be used to recover the initial reactants, and then the chemicals can be reused in a daytime when the energy demand is higher.

The present fuel cell system is very volume- and energy-efficient. The ancillary equipment to operate the device is a simple pump with two channels to supply solutions of reducing and oxidizing agent. Energy necessary for these steps is much less than the chemical energy generated by the cell, which leads to high energy conversion efficiency. The total energy delivered by a flow fuel cell system is limited only by the amount of redox agent and oxidant available.

One of the best-known electroconductive polymers is polyaniline (PANI). Among many other applications, it was proposed to use it as an electrode for oxygen reduction in fuel cells and also as a supercapactor, which can withstand many charging/discharging cycles. By 2010 there were more than 230 papers published only in the J. of Power Sources, mentioning or describing different applications of polyaniline in electrodes for batteries and fuel cells, and also as a material for supercapacitors. PANI is a redox-active polymer and usually when synthesized it has approximately 50% of monomer fragments reduced and 50% oxidized. This redox form is called emeraldine, while 100% reduced form and 100% oxidized forms are leucoemeraldine and pernigraniline, respectively. PANI behavior in contact with aqueous solutions was described in our papers. In many of these experiments PANI was used as a membrane, separating two aqueous solutions. To convert PANI into an active form it is necessary to use doping by HCl or other acids. For the cells with aqueous solutions it is important to have a membrane active at neutral pH. It is possible to achieve this using the membrane doped with d,l-camphor sulfonic acid (CSA). This acid is able to protonate the nitrogens in the polymer, making it electroconductive. After acid doping transmembrane resistance decreases by at least six orders of magnitude, and the membrane becomes $Cl^-/H^+$-selective.

EXAMPLES 1, 2

The films were made by evaporation of 1:2 solution of PANI and CSA in m-cresol and had thickness near 100 micron. The surface area was 5 $cm^2$. The polymer was in the protonated emeraldine form (EB). Polyaniline membrane used in the examples below is not porous and the transmembrane leakage of ions, which is the major challenge of traditional redox fuel cells, is not essential. Two reference Ag/AgCl electrodes were located in two membrane-separated aqueous solutions. It is possible to use as current collectors other electrodes of the second kind, i.e. the electrodes which consist of a metal whose surface is coated with a thin layer of an insoluble salt of the metal and its anion. I have discovered that an addition of an oxidant on one side of the membrane and a reducing agent on another side leads to the spontaneous formation of transmembrane difference of electric potentials. Transmembrane electrical potential for the redox couples of $Fe^+/Fe^{3+}$ (example 1) and $Fe(CN)_6^{4-}/FeCN_6^{3-}$ (example 2) increased with the increase of concentration in one solution, when concentration in another was kept constant (FIG. 2A, 2B and FIGS. 3A and 3B).

It was possible to observe the transmembrane potentials above 110 mV with ferri- and ferrocianide concentrations 0.01M. Ferricianide was added into one solution, and the opposite solution was 0.01M ferrocianide in the same 0.01M phosphate buffer, pH 6.4. In another experiment ferrocianide was added into the opposite side, while ferricianide concentration was constant and equal to 0.01M. The slope was near ideal Nernst slope 56 mV per ten times concentration change. This demonstrates that the transmembrane potential was formed not because of membrane sensitivity to the polyvalent ions but because of one-electron transfer mechanism of transmembrane redox reaction. As the result, further increase of concentration from 0.01M to 1M leads to additional voltage increase by 120 mV.

The films doped with CSA or some other organic acids or even polymers with acidic groups stay active at neutral pH, which is different from depressed electroactivity of PANI-HCl films under these conditions.

EXAMPLE 3

This example demonstrates that it is possible to use not only inorganic but also organic reducing agents. Ascorbic acid, NADH and NADPH, redox active dyes Neutral red, Nile blue and N-phenylanthranilic acid can be used as reducing agents reacting with PANI. The membrane had a good response to redox active substances, which normally do not have satisfactory response on Pt electrode, i.e. ascorbic acid. The slope for ascorbic acid was near 26 mV for ten times concentration changes, corresponding to the redox mechanism with two electrons transferred through the membrane from one molecule of ascorbic acid. The lower concentration limit when these substances start changing transmembrane potential is near 0.2 mM in 0.01M phosphate buffer, pH 6.4.

EXAMPLE 4

Combination of the membrane together with many different redox agents, which can easily react with PANI and have different redox potentials can be used as a source of electric energy. This example demonstrates that using strong oxidizing agents at higher concentrations leads to higher and practically important transmembrane voltage. PANI can electro-catalyze the reduction of $O_2$ in sulfuric acid in fuel cell operations with $H_2O_2$ as the product:

$$LEB + 2A^- + 2H^+ + O_2 \rightarrow ES + H_2O_2 \qquad (1)$$

Here LEB and ES refer to leucoemeraldine base and emeraldine salt, respectively; $A^-$ is the anion from solution, which is then incorporated into ES as the counter ion. Freshly made polyaniline in acidic solutions in contacts with air can easily change its color from green to dark blue and then to black even without electrodes because of redox processes. Mechanism of possible continuous $H_2O_2$ formation and PANI regeneration using reducing potential is presented in the Scheme 1.

Scheme 1. Scheme for continuous oxygen reduction and $H_2O_2$ formation in redox polyaniline-membrane based flow fuel cell.

Thermodynamic electrode potential for two-electron oxygen reduction to hydrogen peroxide in acidic media is 0.7V. The standard electrode potentials for reactions of several very common water-soluble chlorine-based oxidants are:

$$ClO^- + H_2O + 2e^- \rightarrow Cl^- + 2OH^- + 0.89V$$

$$ClO_4^- + 2H^+ + 2e^- \rightarrow ClO_3^- + H_2O + 1.19V$$

$$ClO_3^- + 3H^+ + 2e^- \rightarrow HClO_2 + H_2O + 1.21V$$

$$HClO + H^+ + e^- \rightarrow 0.5Cl_2 + H_2O + 1.63V$$

$$HClO_2 + 2H^+ + 2e^- \rightarrow HClO + H_2O + 1.64V$$

These species react with doped emeraldine and oxidize it. It is also possible to use different reducing agents, including different sulfides or $H_2S$ dissolved in anoxic water on the opposite side of the membrane. Thermodynamic electrode potential for $S + 2e^- \rightarrow S^{2-}$ is near $-0.447V$. If the membrane has an ideal redox-selectivity, the transmembrane voltage will be in the range from $-1.337$ V to $-2.087$ V, which is even $0.415V$ better than the difference of thermodynamic electrode potentials for fuel cells with air and hydrogen as fuel.

It is also possible to use different pares of reducing and oxidizing agents which have found applications in redox flow cells, including bromide/polysulfide, vanadium(V)/vanadium(IV), vanadium(IV)/bromide, chromium(III)/iron(II), etc.

EXAMPLE 5

This example demonstrates that transmembrane potential can be additionally influenced by changes of chloride anion concentration. Addition of potassium chloride into the reducing solution increases the transmembrane voltage and makes it even more negative. Addition of KCl into the opposite solution decreases the value of transmembrane voltage.

The transmembrane electric potential difference across the doped PANI membrane is a mixed potential due to both electron transport in redox processes and simultaneous $Cl^-$ ion transport. When the first reversible pair of redox agents is present in one of the solutions and the second in another, transmembrane voltage is described by the equation $$V = \Delta E_0 - \frac{2.3RT}{nF}\text{Log}\frac{red_1 + \alpha Cl_1^-}{ox_1 - \beta Cl_1^-} + \frac{2.3RT}{nF}\text{Log}\frac{red_2 + \alpha Cl_2^-}{ox_2 - \beta Cl_2^-}$$

Here red, ox and $Cl^-$ are activity of corresponding species; subscripts 1 and 2 correspond to the two solutions separated by the membrane; and $\alpha$ and $\beta$ characterize membrane selectivity for pairs red/$Cl^-$ and ox/$Cl^-$. $\Delta E_0$ is the difference of standard redox potentials of the second and first redox pair, respectively. Without chloride this equation is simplified to the Nernst equation:

$$V = \Delta E_0 - \frac{2.3RT}{nF}\text{Log}\frac{red_1}{ox_1} + \frac{2.3RT}{nF}\text{Log}\frac{red_2}{ox_2}$$

Figure 1:
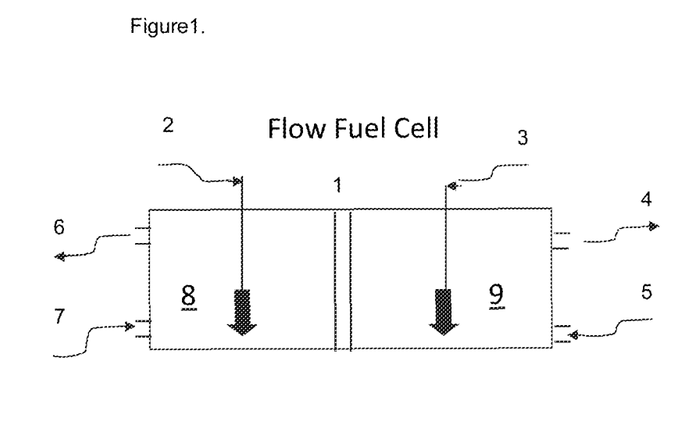
FIG. 1 shows the redox membrane-based flow fuel cell with the membrane (1), current-collecting electrodes (2, 3) and inlets (5, 7) and outlets (4, 6) connectable for flow to another cell.
Figure 2A:
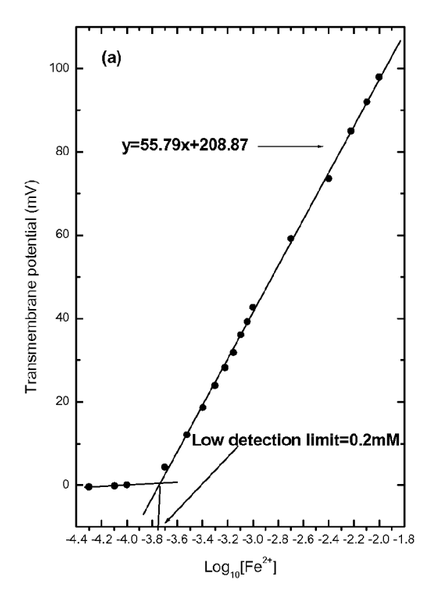
FIGS. 2A and 2B show the behavior of transmembrane potential with changing of $Fe^{2+}$ and $Fe^{3+}$ concentrations (pH adjusted to 1.14 by HCl). For the experiments with addition of $FeCl_2$ the opposite solution had 0.01M $FeCl_3$ and vice versa. Membrane: PANI film doped with CSA.
Figure 2B:
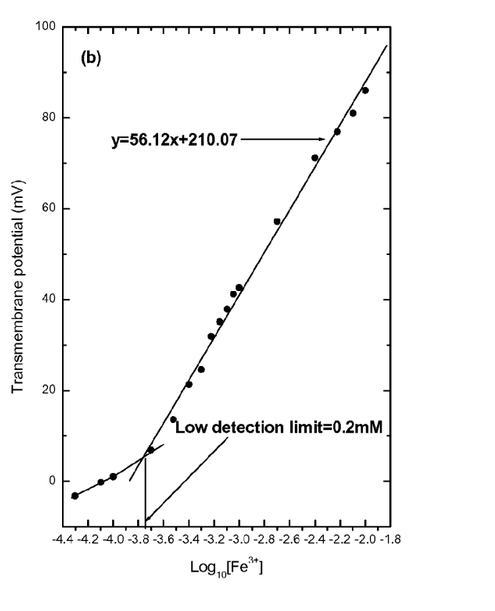
Figure 3A:
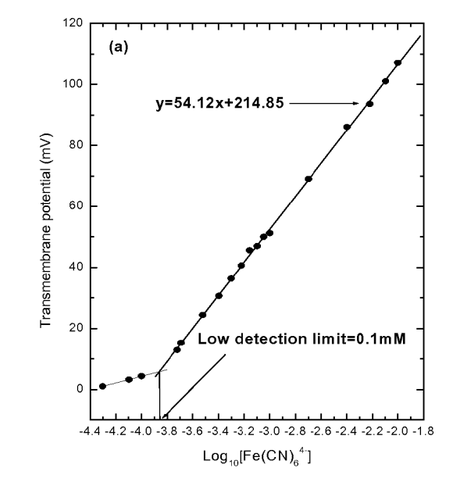
FIGS. 3A and 3B show the behavior of transmembrane potential with changing of $K_4Fe(CN)_6$ and $K_3Fe(CN)_6$ concentrations in a phosphate buffer with pH 6.4. For the experiments with addition of $K_4Fe(CN)_6$ the opposite solution had 0.01M $K_3Fe(CN)_6$ and vice versa. Membrane: PANI film doped with CSA.
Figure 3B:
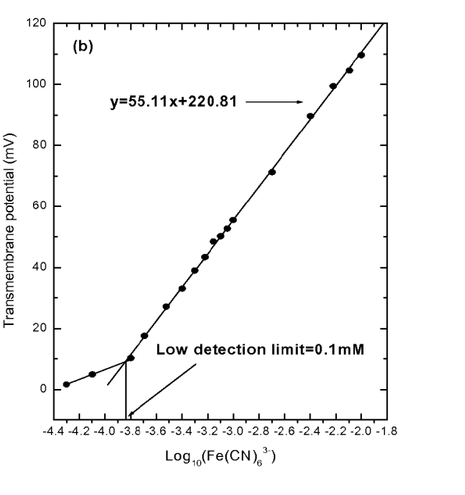
Figure 4:
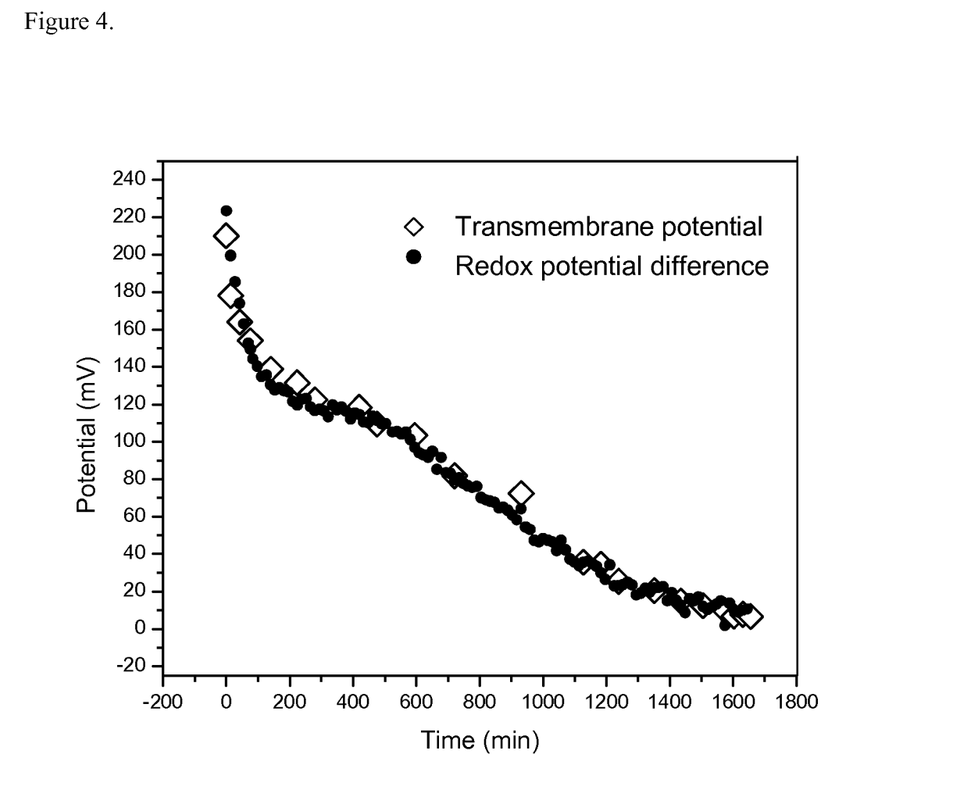
FIG. 4 shows changes with time of transmembrane potential and difference of redox potentials between two liquid phases because of transmembrane redox reaction. Reducing agent: 0.01M $FeCl_2$+0.1M HCl solution; oxidizing agent: 0.1M $FeCl_3$+0.1M HCl solution.

Transmembrane electric potential in this case is equal to the difference of redox potentials in solutions, which was confirmed by direct measurements of redox potential in both solutions using Pt and reference electrodes (FIG. 4). Without renewal of the solutions the transmembrane voltage slowly decreased with time because of the simultaneous transmembrane redox reactions, leading to the concentration changes of the redox active components in the two solutions. This electrically neutral process is much slower than charge separation through the membrane (electron mobility is ~ four orders of magnitude higher than that of ions in the polymer), which explains generation of practically ideal transmembrane Nernst potential.

EXAMPLE 6

Electric resistance of a mechanically stable CSA doped PANI membrane with the surface area less than 5 cm$^2$ and thickness 40 micron was less than 1 ohm, which means a possibility to produce currents above 1 A.

EXAMPLE 7

Figure 5:
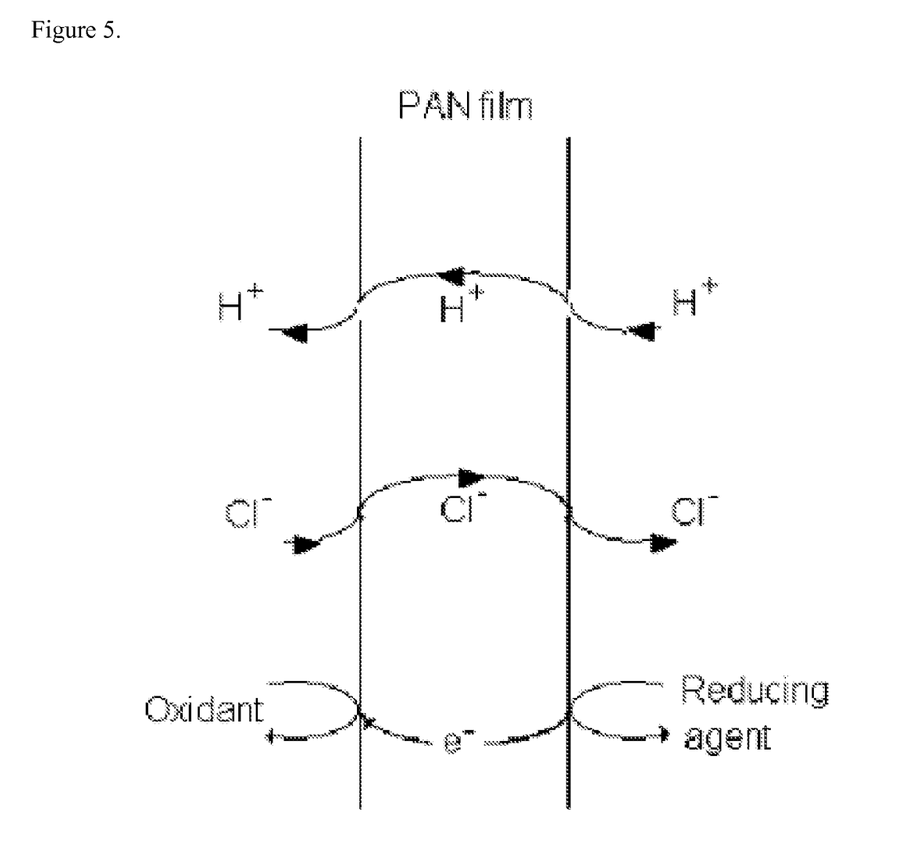
FIG. 5 illustrates transport of electrons and ions through the PANI membrane. Electroneutral coupled chloride/electron counter transport and proton/electron cotransport lead to the transmembrane redox reactions, while fast and not compensated electron transport leads to the charge separation and generation of transmembrane voltage.

One minute was enough for formation of transmembrane potential, which was initially above 220 mV. This value was exactly equal to the difference of redox potentials measured in separated by the membrane solutions (FIG. 4). With time the transmembrane potential slowly decreased because of the transmembrane redox reaction (FIG. 5), but it was possible to keep it constant when both reducing and oxidizing solutions were continuously flowing through the separated by the membrane compartments. Utilization of an oxidant will depend on the rate of reaction, and on flow rate and recycling of the oxidant.

EXAMPLE 8

With time AgCl from the current collector electrodes dissolves in one solution and it is formed in another. Possibility to swap the flows in the chamber (initially the reducing and oxidant solutions are flowing through compartments 1 and 2, and then-through 2 and 1, respectively) allows further use of the flow fuel cell.

Taking into account the continuous supply of fuel to the system during long-term operation, the energy density of the fuel cell in terms of Wh/kg will be greater than that of advanced battery systems. It is possible to do a simple estimate. Assume that 1 kg of a solid oxidant has 10 mols of a salt, and each molecule accepts 8 electrons, as it is for $KClO_4$ reduced into $Cl^-$. In this case the total charge transferred is $8 \times 10^6$ Q/kg or 2222 Ah per kg of potassium perchlorate. The electric power supplied by 5 $cm^2$ is more than $1V \times 1 A = 1$ W. To have 50 W source we will need less than 17 cm×17 cm membrane.

The advantages of proposed system are low cost, modularity, flexible operation, possibility to use sea water with dissolved sodium chloride and to discharge solutions completely for maintenance without damaging the electrochemical cells. Cost effectiveness of suggested approach will be better than existing technology because it will be based on easily made, simple and cheap polymer materials instead of Pt electrodes.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A redox membrane based flow fuel cell, which can be used as a source of electrochemical energy, the cell comprising:
   a reducing agent solution compartment with an inlet and outlet to supply reducing agent solution;
   an oxidation agent solution compartment with an inlet and outlet to supply oxidation agent solution;
   a barrier between said reducing agent solution compartment and said oxidation agent solution compartment consisting of a water-insoluble synthetic metal polymer membrane lacking any separate electrode on surfaces of the membrane and being exposed directly to said reducing agent solution compartment and said oxidation agent solution compartment; and
   a current collection reference electrode in each of said reducing agent solution compartment and said oxidation agent solution compartment disposed to convert ion to electron transport from respective reducing agent solution and oxidation agent solution in said reducing agent solution compartment and said oxidation agent solution compartment.

2. A redox membrane-based flow fuel cell of claim 1, wherein the synthetic metal polymer membrane comprises polyaniline, polypyrrole or polythiophene or their derivatives and/or their mixtures, so that the polymer is in electroconductive state.

3. A redox membrane-based flow fuel cell of claim 2, wherein the polyaniline is doped with camphor sulfonic acid.

4. A redox membrane-based flow fuel cell of claim 1, wherein the synthetic metal polymer membrane comprises a polymer having a system of polyconjugated double bonds that serve as a path for electron conductivity.

5. A redox membrane-based flow fuel cell of claim 1, wherein the synthetic metal polymer membrane comprises polyaniline in a protonated emeraldine form treated with camphor sulfonic acid.

6. A redox membrane-based flow fuel cell of claim 1, wherein the synthetic metal polymer membrane comprises a derivative of a polyaniline, polythyophene and polypyrrole, including polymers of the pure monomer and the class of polymers derived from the base class of substituted monomers.

* * * * *